(12) United States Patent
Kunjan et al.

(10) Patent No.: US 7,096,290 B2
(45) Date of Patent: Aug. 22, 2006

(54) ON-CHIP HIGH SPEED DATA INTERFACE (75) Inventors: Thomas Kunjan, Dresden (DE); Frank Barth, Radebeul (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 410 days.

(21) Appl. No.: 10/259,665

(22) Filed: Sep. 27, 2002

(65) Prior Publication Data

US 2003/0188071 A1 Oct. 2, 2003

(30) Foreign Application Priority Data

Mar. 28, 2002 (DE) .............................. 102 14 067

(51) Int. Cl.
*G06F 13/00* (2006.01)
*H04B 1/38* (2006.01)

(52) U.S. Cl. .................... 710/112; 710/310; 375/220

(58) Field of Classification Search ............... 710/315, 710/312, 310, 309, 305, 262, 240, 110, 107, 710/60, 100, 112, 260, 316; 375/220; 714/49; 709/251, 208

See application file for complete search history.

(56) References Cited

U.S. PATENT DOCUMENTS

| | | | | |
|---|---|---|---|---|
| 4,234,919 A | * | 11/1980 | Bruce et al. ................. | 710/306 |
| 4,958,271 A | * | 9/1990 | Yoshida et al. .............. | 710/309 |
| 5,007,012 A | | 4/1991 | Dujari | |
| 5,664,117 A | * | 9/1997 | Shah et al. .................. | 710/100 |
| 5,692,200 A | * | 11/1997 | Carlson et al. .............. | 710/262 |
| 5,764,933 A | * | 6/1998 | Richardson et al. ......... | 710/312 |
| 5,828,852 A | * | 10/1998 | Niedermeier et al. ........ | 710/110 |
| 5,898,848 A | * | 4/1999 | Gulick ........................ | 710/310 |
| 5,898,895 A | * | 4/1999 | Williams ..................... | 710/60 |
| 6,026,455 A | * | 2/2000 | Shah et al. .................. | 710/100 |
| 6,032,178 A | * | 2/2000 | Bacigalupo et al. ......... | 709/208 |
| 6,151,651 A | * | 11/2000 | Hewitt et al. ................ | 710/315 |
| 6,266,715 B1 | | 7/2001 | Loyer et al. | |
| 6,279,064 B1 | * | 8/2001 | Bronson et al. ............. | 710/112 |
| 6,353,867 B1 | | 3/2002 | Qureshi | |
| 6,418,494 B1 | * | 7/2002 | Shatas et al. ................ | 710/305 |
| 6,442,196 B1 | * | 8/2002 | Quicksall ..................... | 375/220 |
| 6,442,634 B1 | * | 8/2002 | Bronson et al. ............. | 710/260 |
| 6,681,279 B1 | * | 1/2004 | Peng ............................ | 710/240 |
| 6,697,906 B1 | * | 2/2004 | Ayukawa et al. ............ | 710/316 |
| 6,728,909 B1 | * | 4/2004 | Bunton et al. ................ | 714/49 |
| 2003/0041176 A1 | * | 2/2003 | Court et al. ................. | 709/251 |
| 2003/0126331 A1 | * | 7/2003 | Levy ............................ | 710/107 |

OTHER PUBLICATIONS

"HyperTransport™ I/O Link Specification, Revision 1.03", HyperTransport Technology Consortium, Oct. 10, 2001.

* cited by examiner

*Primary Examiner*—Rehana Perveen
*Assistant Examiner*—Christopher E. Lee
(74) *Attorney, Agent, or Firm*—Meyertons Hood Kivlin Kowert & Goetzel, P.C.; B. Noël Kivlin (57) ABSTRACT

An integrated circuit chip, particularly a southbridge, is provided that has a first and a second circuit unit. Each circuit unit can send requests to the other one and send back a response when receiving a request that requires a response. The first circuit unit can store data relating to a request to be sent, and the second circuit unit cannot store data relating to a received request. Thus, an on-chip interface is provided that may increase the overall system performance and that may support split transaction.

61 Claims, 12 Drawing Sheets

ON-CHIP HIGH SPEED DATA INTERFACE

BACKGROUND OF THE INVENTION

1. Field of the Invention

The invention generally relates to on-chip data interfaces, and in particular to integrated circuit chips having circuit units that may interchange requests and responses.

2. Description of the Related Art

Integrated circuit chips are often used for data processing and are known to comprise a number of different circuit units. Generally, each circuit unit is for performing a specific function and of course, there may be different circuit units provided on one chip for performing different functions. The circuit units may operate sequentially or simultaneously, and they may function independently from each other, or dependent on the operation of other circuit units.

In the latter case, the circuit units are usually interconnected via an interface to allow the circuit units to interchange data needed for making the operation of one circuit unit dependent on the operation of the other circuit unit. The data exchange is often done by sending transactions from one circuit unit to the other circuit unit. A transaction is a sequence of packets that are exchanged between the circuit units and that result in a transfer of information. The circuit unit initiating a transaction is called the source, and the circuit unit that ultimately services the transaction on behalf of the source is called target. It is to be noted that there may also be intermediary units between the source and the target.

Transactions may be used to place a request, or to respond to a received request. Taking the requests, there may be distinguished posted request from non-posted requests, dependent on whether the request requires a response. Specifically, a non-posted request is a request that requires a response while a posted request does not require a response.

When focusing on the functions which are performed by the inter-connected circuit units, the circuit units can often be divided into hosts and devices. The term host then means a circuit unit that provides services to the dependent device. A transaction from the host to the device is said to be downstream, while a transaction in the other direction is said to be upstream. In bi-directional configurations, both the host and the device may send and receive requests and responses so that a device may be a source as well as target, and also the host may function as source as well as a target.

Figure 1:
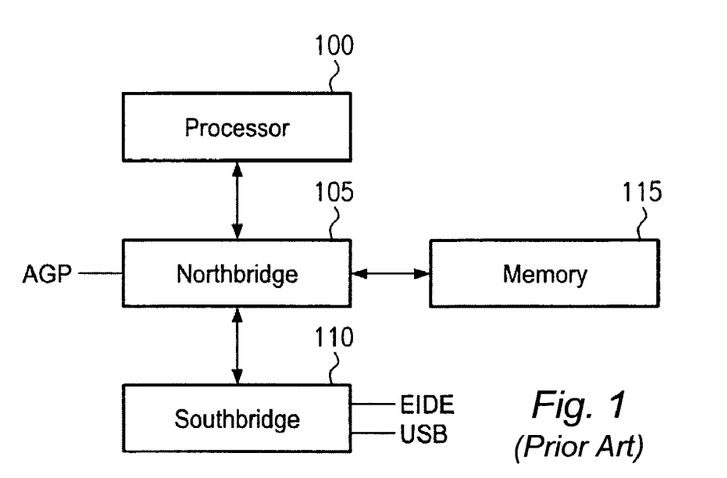
FIG. 1 illustrates a common motherboard layout.

A field where such integrated circuit chips are widely used are personal computers. Referring to FIG. 1, the hardware components of a common motherboard layout are depicted. It is to be noted that this figures shows only one example of a motherboard layout, and other configurations exist as well. The basic elements found on the motherboard of FIG. 1 include the CPU (Central Processing Unit) 100, a northbridge 105, a southbridge 110, and system memory 115. The northbridge 105 usually is a single chip in a core-logic chipset that connects the processor 100 to the system memory 115 and, e.g., to the AGP (Accelerated Graphic Port) and PCI (Peripheral Component Interface) buses. The PCI bus is commonly used in personal computers for providing a data path between the processor 100 and peripheral devices like video cards, sound cards, network interface cards and modems. The AGP bus is a high-speed graphic expansion bus that directly connects the display adapter and system memory 115. AGP operates independently of the PCI bus.

The southbridge 110 is usually the chip in a system core-logic chipset that controls the IDE (Integrated Drive Electronics) or EIDE (Enhanced IDE) bus, the USB (Universal Serial Bus), that provides plug-n-play support, controls the PCI-ISA (Industry Standard Architecture) bridge, manages the keyboard/mouse controller, provides power management features, and controls other peripherals.

Thus, common personal computers include southbridges 110 which are integrated circuit chips substantially as described above. To satisfy the demands for high-speed chip-to-chip communication to and from the southbridge 110, the HyperTransport™ technology was developed which provides a high-speed, high-performance point-to-point on-board link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy computer buses, to be extensible to new system network architecture buses, to be transparent to operating systems, and to offer little impact on peripheral drivers.

While the HyperTransport interface thus provides a high-speed chip-to-chip interface, data processing performed within the chips itself may often become the bottle neck. Thus, there is a problem in the prior art that the full performance provided by on-board interchip interfaces such as the HyperTransport interface cannot be brought down to the peripherals since the on-chip interfaces in intermediate integrated circuit chips decrease the overall performance.

SUMMARY OF THE INVENTION

An improved on-chip interface is therefore provided that may allow for increasing the overall system performance and that may provide lower latency.

In one embodiment, an integrated circuit chip is provided that comprises a first and a second circuit unit. Each of the first and second circuit units are capable of sending requests to the other one of the first and second circuit units. Further, each of the first and second circuit units are capable of sending back a response when receiving a request that requires a response. The first circuit unit is capable of storing data relating to a request to be sent. The second circuit unit is not capable of storing data relating to a received request.

In another embodiment, there may be provided a southbridge device that comprises an integrated circuit chip having a first and a second circuit unit. Each of the first and second circuit units are capable of sending requests to the other one of the first and second circuit units. Further, each of the first and second circuit units are capable of sending back a response when receiving a request that requires a response. The first circuit unit is capable of storing data relating to a request to be sent. The second circuit unit is not capable of storing data relating to a received request.

In a further embodiment, a method of operating an integrated circuit chip that comprises a first and a second circuit unit is provided. The method comprises sending requests from one of the first and second circuit units to the other one of the first and second circuit units, and sending back a response from the other one of the first and second circuit units to the one of the first and second circuit units if the request requires a response. The method further comprises operating the first circuit unit to store data relating to a request to be sent by the first circuit unit, and operating the second circuit unit not to store data relating to a request received by the second circuit unit.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 2:
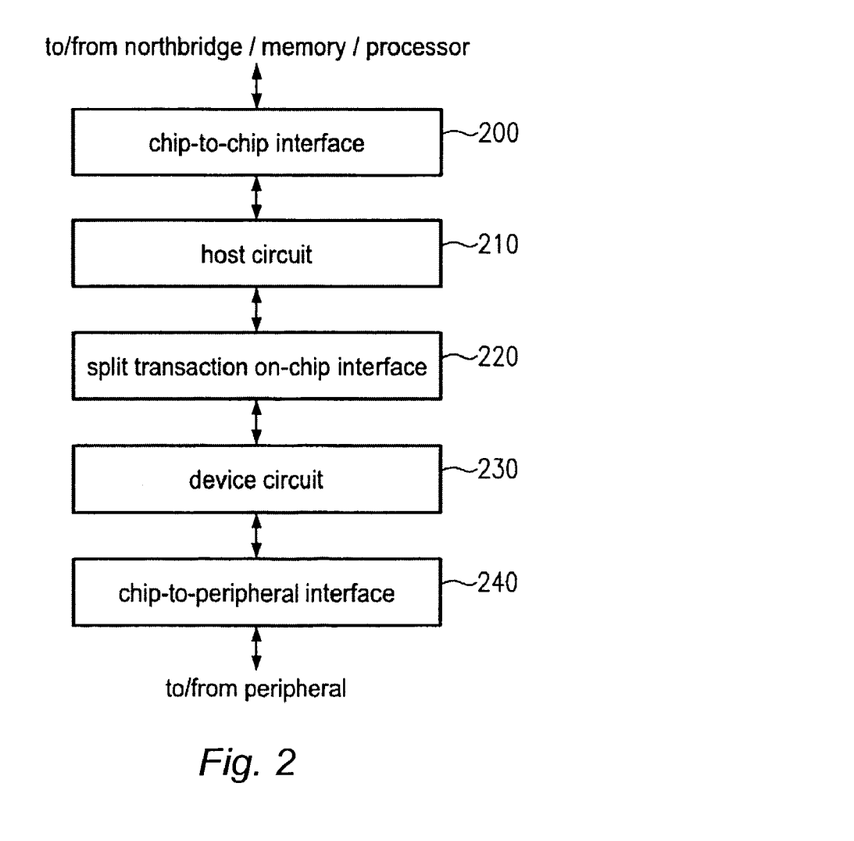
FIG. 2 illustrates a southbridge according to an embodiment.

Referring now to the drawings and particularly to FIG. 2 which illustrates the components of a southbridge according to an embodiment, the device comprises a host circuit 210 and a device circuit 230. The host circuit 210 is connected via chip-to-chip interface 200 to a northbridge or to another integrated circuit chip such as a memory controller or processor. The chip-to-chip interface 200 of the present embodiment may be a HyperTransport link.

On the other side, the southbridge includes a chip-to-peripheral interface 240 to connect the device circuit 230 to the peripherals.

Further there is an on-chip interface 220 provided between the host circuit 210 and the device circuit 230. This on-chip interface may be a split transaction interface. Split transaction interfaces are interfaces where requests and responses are transferred on the bus as completely decoupled and independent transactions. An example of a split transaction interconnect is the HyperTransport interface which however is a chip-to-chip interface 200. In the present embodiment, it is an on-chip interface 220 which has this functionality.

The on-chip interface 220 of the present embodiment has two components, a target interface and a source interface. These interfaces are depicted in more detail in FIGS. 3 and 11, respectively, and will be discussed below. The target interface is the interface where requests are sent downstream, i.e. from the host to the device, and responses are sent upstream. On the other hand, the source interface is the interface where requests are sent upstream and responses downstream. In the following, a request in the target interface is also called target command, and a request in the source interface is also called source command.

Figure 3:
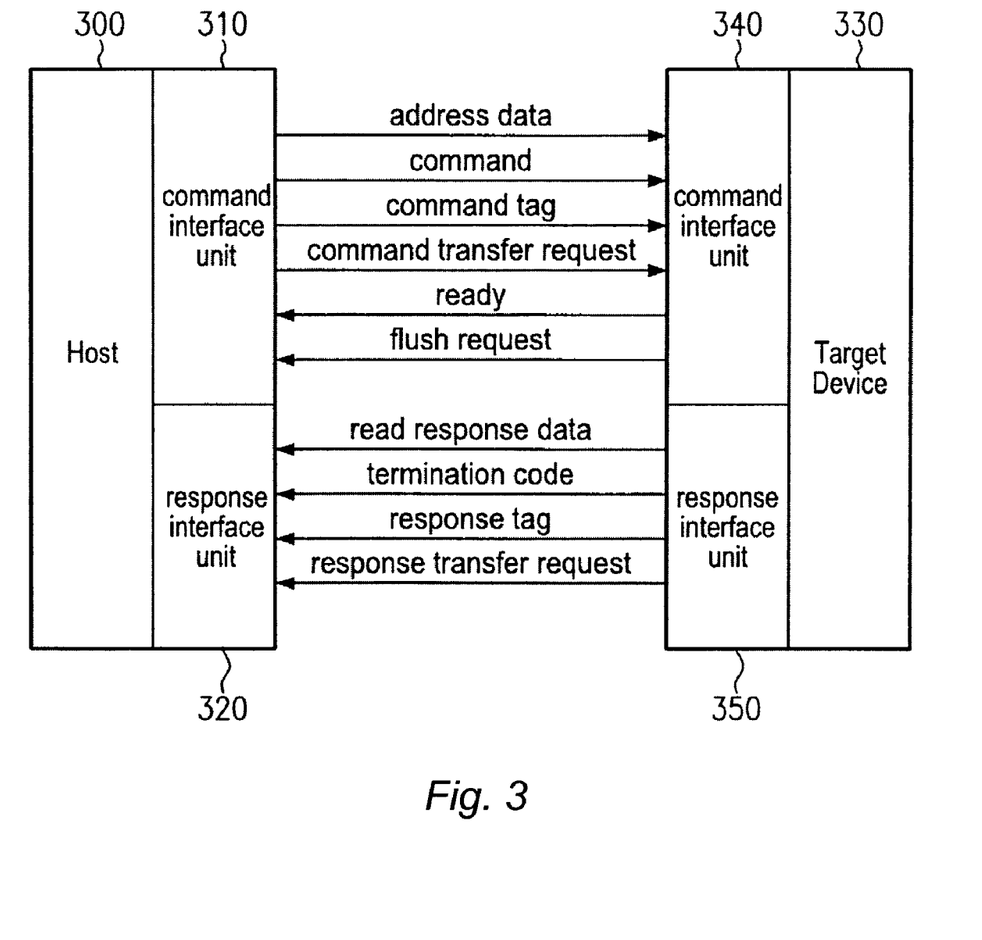
FIG. 3 illustrates a target interface according to an embodiment.
Figure 11:
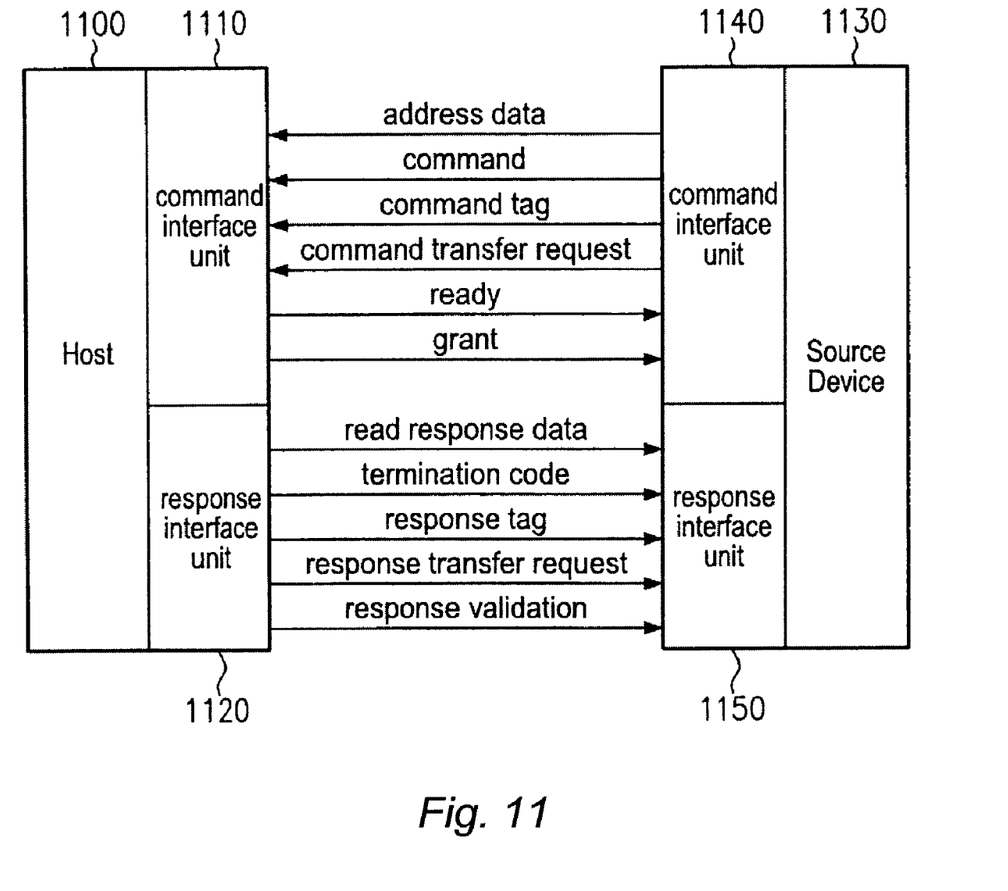
FIG. 11 illustrates a source interface according to an embodiment.

Given the target and source interfaces shown in FIGS. 3 and 11, respectively, an interface between two circuit units 210, 230, 300, 330, 1100, 1130 is provided where each unit can send requests to the other unit and can also send back a response, if required, i.e. in case of a non-posted request. The target interface may support multiple outstanding non-posted requests, i.e. tags. Moreover, all the data for the source interface, e.g. bus master data, is only stored in the device 230, 330, 1130 but not in the host 210, 300, 1100.

That is, the host buffers all target commands and responses to target commands, and the device is therefore allowed to pause a target command transmission while the host is not allowed to pause a target response transmission. On the other hand, the device buffers all source commands (including data) and all responses to source commands. Therefore, the device is not allowed to pause a source command transmission and response transmission while the host may pause response or command transmissions.

In the present embodiment, there may be two kinds of responses: read responses and target done responses. Both may contain termination information. In addition, a read response returns also data. The commands may be distinguished by their types (read or write) and depending on whether the request is a posted or a non-posted request. Non-posted read-like requests require a read response and non-posted write-like requests require a target done response.

Further, the commands may have a different number of data phases, and the number of data phases allowed for the request may be predefined. This determines the length of the request (if write-like) or the response (read-like).

Turning now to FIG. 3 which illustrates an embodiment of a target interface, the host 300 and the target device 330 are connected by multiple signal lines for transferring request and response data. For this purpose, each of the host 300 and the target device 330 comprise a command interface unit 310 and 340, respectively, and a response interface unit 320 and 350, respectively. These units form command and response channels.

In the command channel, there may be downstream transmissions from the command interface unit 310 of the host 300 to the command interface unit 340 of the target device 330. For instance, the address data signal line is used to transfer addresses, count values and write data. The command signal line may be used to transfer commands and byte enable signals. The command tag signal line is used to transfer tags and word indexes. Further, there is a command transfer request signal line that allows the host 300 to request a command transfer.

In the command channel, there are also upstream signal lines that allow the device 330 to signal if it is ready to accept a command or data phase (the ready signal line) and to request flushing of outstanding data phases (the flush request signal line).

In the response channel there may be provided the following upstream signal lines: the read response data signal line for transferring read response data, the termination code signal line for transferring transaction termination codes, the response tag signal line for transferring response tags, and the response transfer request signal line for requesting the transfer of a response.

The operation of the target interface will now be described in more detail with reference to FIGS. 4 and 8 which are flowcharts illustrating the downstream request transmission and upstream response transmission processes, respectively. Examples of waveforms on the signal lines of the target interface are shown in the waveform diagrams of FIGS. 5 to 7 and 9 to 10.

Figure 4:
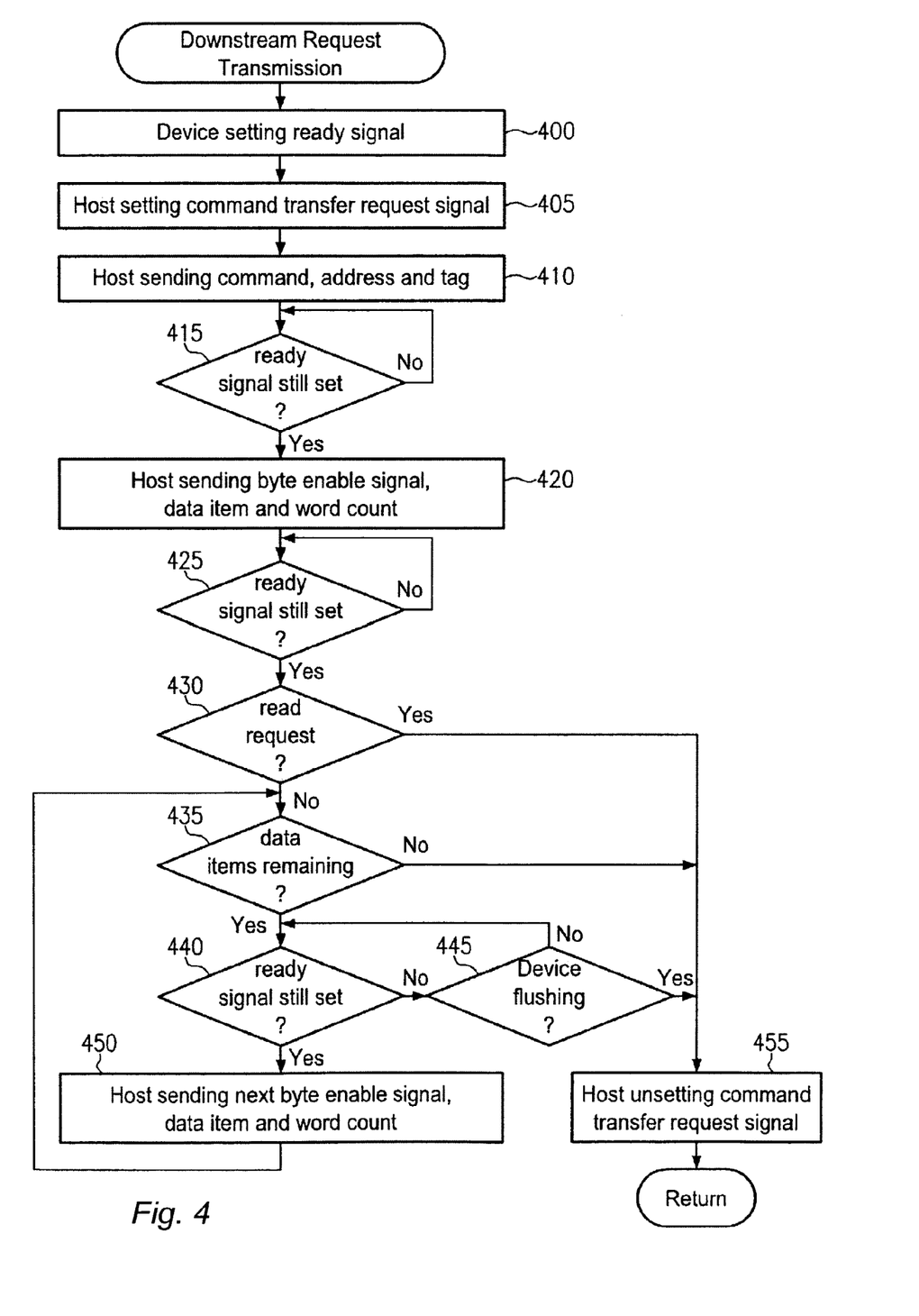
FIG. 4 is a flowchart illustrating the process of performing a downstream request transmission using the target interface shown in FIG. 3.

Turning now first to the flowchart of FIG. 4, all downstream requests coming from the host 300 use the target interface to communicate with the device 330. The host command interface unit 310 buffers all downstream requests that may be received e.g. over the chip-to-chip interface 200, decodes the received requests and forwards them to the device 330, and more specifically, to command interface unit 340. A device which is able to accept a new request, i.e. which is in an idle mode, keeps the ready signal line asserted (step 400). The host then signals a new request by setting the command transfer request signal in step 405 and places the command code on the command signal line, the address on the address data signal line, and the tag on the command tag signal line (step 410).

The host holds this pattern until it samples the ready signal line asserted (step 415). Then it places the byte enable on the command line, the number of double words to transfer on the command tag line and the first data item, if the command is of the write type, on the address data signal line (step 420). Again, the host holds this pattern until it sample the ready line asserted (step 425).

The check in step 425 to determine if the ready signal is still set enables the device to delay the byte enable phase (if of read type) and/or the first data phase (if of write type). If the request is a read request then the host may be obliged to unset the command transfer request signal to ensure that back-to-back processes are not possible (step 455). If the request is a write request with more than one data phases (checked in step 435) then the host will keep the command transfer request signal asserted and place the next data onto the address data signal line, the next byte enable on the command signal line and decrement the value on the command tag signal line (step 450).

The device may unset the ready signal to pause the transmission of each data item (step 440), and the transmission is paused until the device reasserts the ready signal. With every clock cycle where the command transfer request signal and the ready signal are sampled asserted, one data item is transmitted. With the transmission of the last data item, the command tag signal will reach zero.

The device has also the possibility to flush outstanding data phases by setting the flush request signal instead of the ready signal for one cycle. As apparent from FIG. 4, the present embodiment requires the ready signal to be unset (step 440) when setting the flush request signal (step 445). If the device sends a flush request signal, the host will unset the command transfer request signal in step 455.

Figure 5:
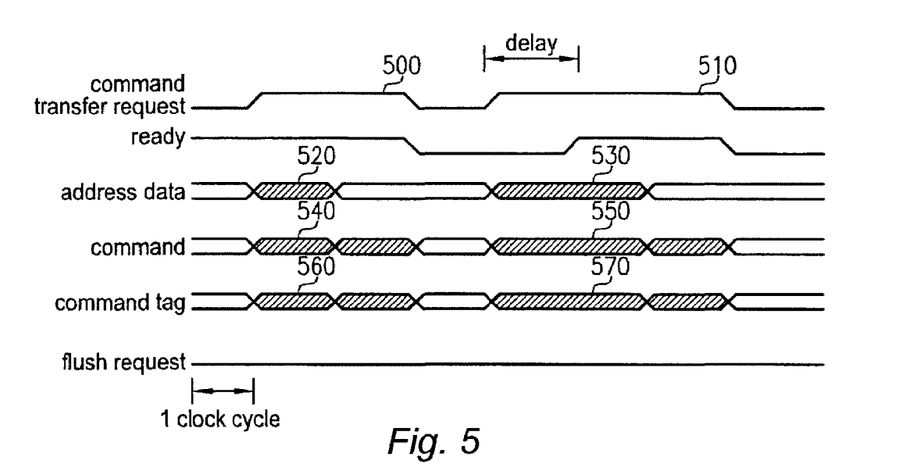
FIG. 5 is a waveform diagram illustrating waveforms that may occur when performing a downstream request transmission.
Figure 6:
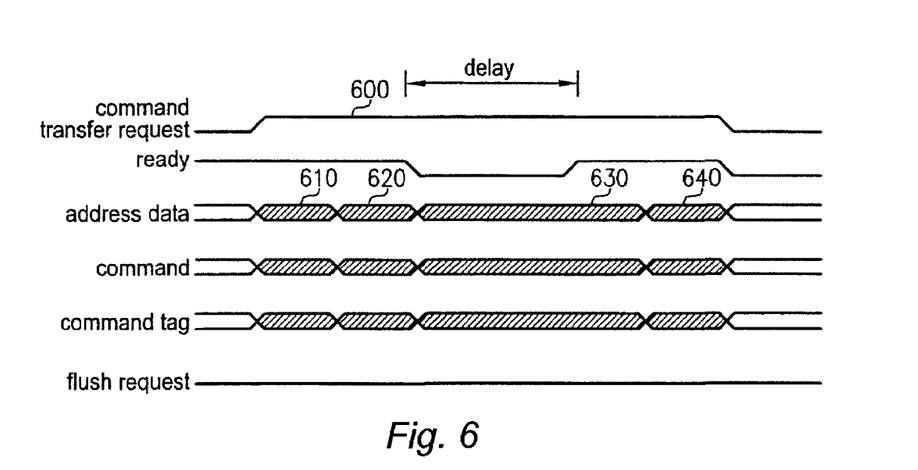
FIG. 6 is another waveform diagram that pertains to a downstream request transmission.
Figure 7:
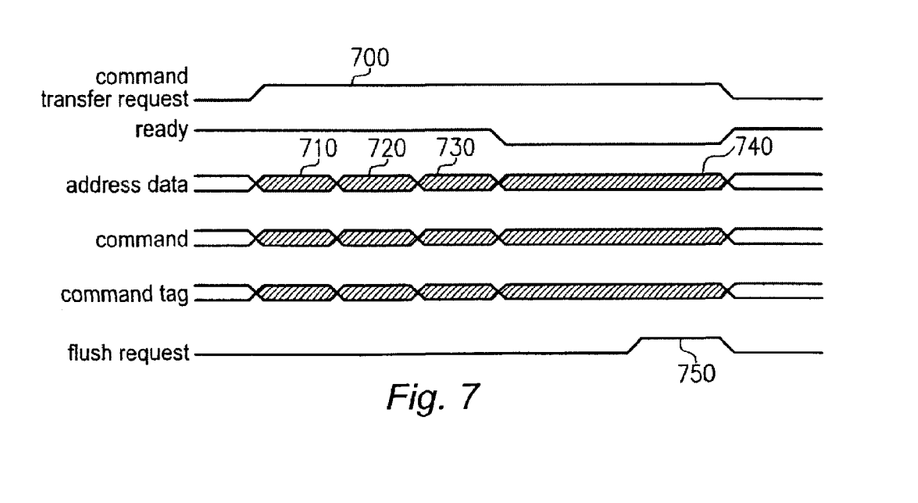
FIG. 7 is yet another waveform diagram for illustrating the downstream request transmission.

Turning now to FIGS. 5 to 7, waveforms will be discussed in more detail that may occur when performing the process of transmitting requests downstream. In FIG. 5, there are two read requests transmitted in cycles 500 and 510, respectively. In each cycles, address data 520, 530 are transmitted, together with command data 540, 550 and command tags 560, 570. As can be seen from FIG. 5, at the time the second cycle 510 starts, the ready signal is still down. In the example of FIG. 5 the device sets the ready signal one clock later so that the device delays the execution of the second cycle 510 by one clock period.

In the example of FIG. 6, there is shown a single write cycle 600 where on the address data line, address data 610 and a number of data items 620, 630, 640 are transferred. After having transferred the first data item 620, the device unsets the ready signal so that the second data phase 630 is delayed by two clock cycles.

The example of FIG. 7 again shows a single write cycle 700. After the second data phase 730, the ready signal is unset to delay the third data phase 740. However, during the third data phase 740, the flush request 750 is set so that the device flushes subsequent data phases after the second one.

Figure 8:
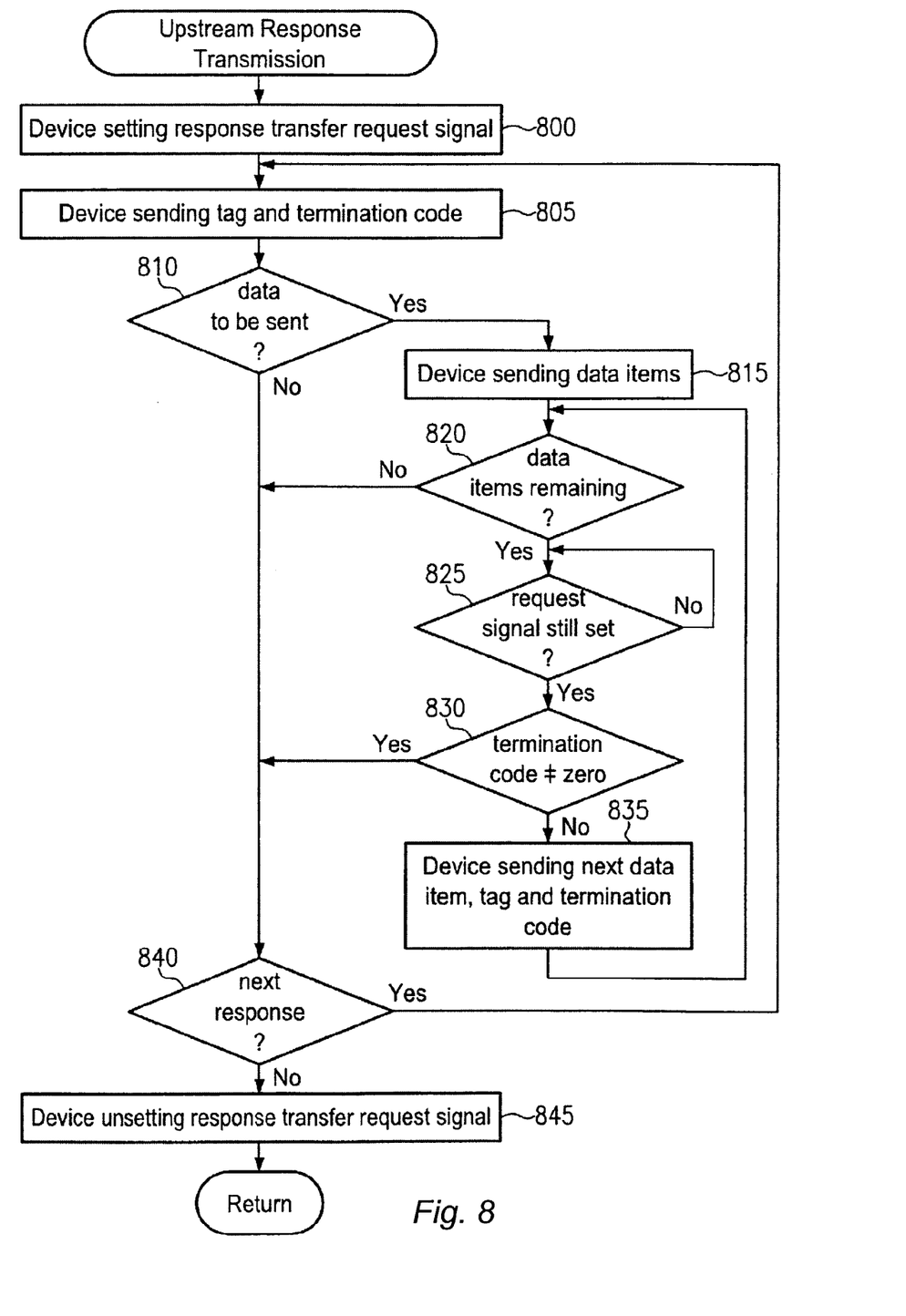
FIG. 8 is a flowchart illustrating the process of performing an upstream response transmission according to an embodiment.

Turning now to FIG. 8, an embodiment of the process to perform an upstream response transmission in the target interface is shown. As mentioned above, to every non-posted request received from the host, the device is required to send a response with the tag of the request. Responses may be sent in any order, even out of order, i.e. this order needs not match the order of the request. The host response interface unit 320 buffers all responses and has therefore, in the present embodiment, no possibility to delay or pause a response transmission.

The device signals the start of a response transmission by setting the response transfer request signal in step 800. It further places the tag on the response tag line and the termination code on the termination code signal line (step 805). It is then determined in step 810, whether the response contains data. If so, the device places the first data item onto the read response data signal line in step 815. If the response contains multiple data items, the device may unset the response transfer request signal in step 825 to pause the response transmission, or may keep the line asserted to transmit a data double word with each clock cycle (step 835).

The termination code signal line is used to communicate a termination code to the host. If this code is zero, the device signals that the transfer is completed. Non-zero termination codes are used for signalling an error, a transfer abort, or a completion with invalidated data.

It may therefore be checked in step 830 whether the termination code is zero or not. The device may change the termination code within each data phase. The response transmission will thus finish when either all data items are transmitted or the termination code has a non-zero value and the response transfer request signal is set.

After the response transmission has finished, the device may unset the response transfer request signal in step 845, or keep the request signal set and place a new response (step 840).

Figure 9:
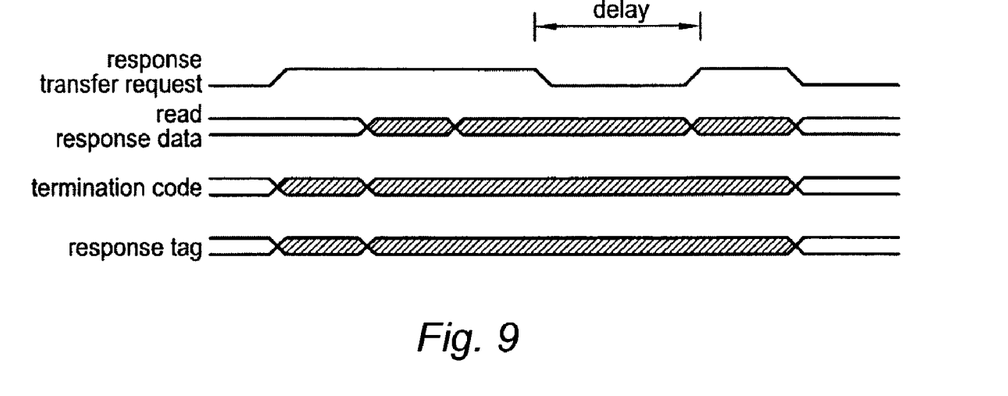
FIG. 9 is a waveform diagram showing waveforms for illustrating an upstream response transmission.
Figure 10:
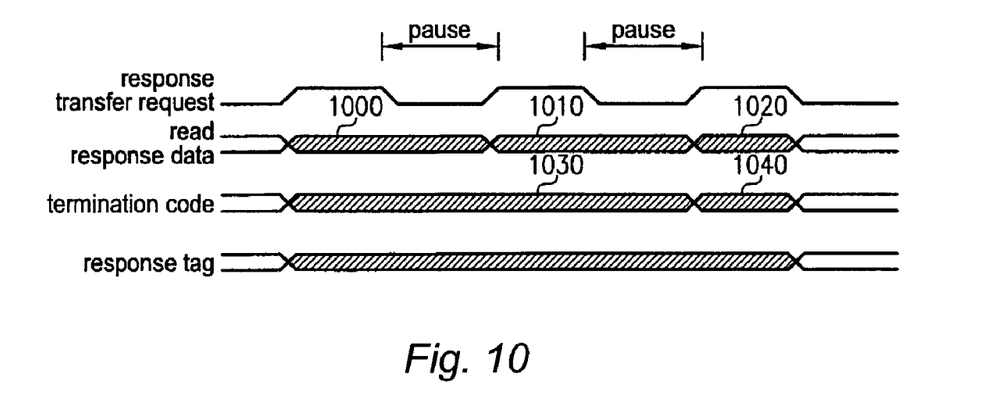
FIG. 10 is another waveform diagram illustrating an upstream response transmission.

FIGS. 9 and 10 show waveform examples of the upstream response transmission discussed above. FIG. 9 depicts a back-to-back process containing a write and a read response. By unsetting the response transfer request signal, the third data item is delayed.

In the example of FIG. 10, the first and second data phases 1000, 1010 are paused, and during the third data phase 1020 the termination code is changed from a zero code 1030 to a non-zero code 1040, thus indicating a non-completion termination.

In another embodiment, the host may pause a target command or response transmission, in particular where more than one of such transmissions are possible at the same time, and where the transmissions are read from and/or written to the same memory. In this implementation, the host may deassert the ready signal while perfoming a command transmission. For pausing a response transmission, a another ready signal might be used.

Turning now to FIG. 11, the source interface of the present embodiment is depicted. Again, there is a command channel formed by the signal lines connecting the command interface unit 1110 of the host 1100 and the corresponding unit 1140 of the source device 1130. A response channel is formed by the respective response interface units 1120, 1150. In the source interface, requests are transmitted upstream and responses downstream.

Figure 12:
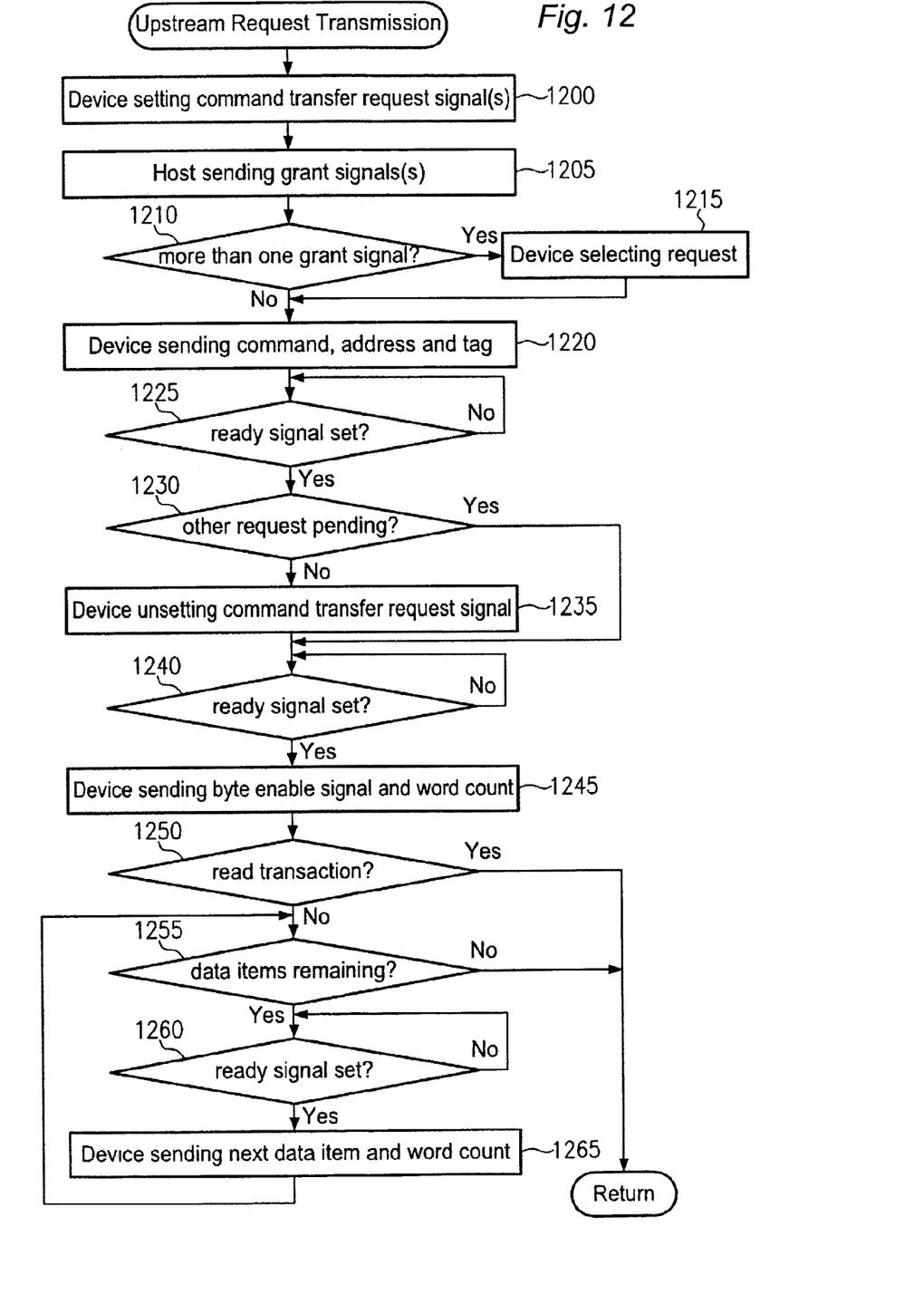
FIG. 12 is a flowchart illustrating the process of performing an upstream request transmission according to an embodiment.

Turning first to the upstream request transmission, FIG. 12 illustrates the specific process steps. In step 1200, the device signals by setting the command transfer request signal that it intends to transfer a command. There may be one or more lines asserted for this purpose. If it asserts one of the request lines there may be the constraint to be able to deliver the command and the regarding data (if of write type) with the full interface speed without wait cycles. The device must not deassert the request line until it samples the grant line asserted. The host signals if it is able to accept a transaction, with the grant line (step 1205). It must not assert one of the grant lines without the respective request line asserted. It may assert multiple or all grant lines as well, and in this case the device has to decide which request it wants to transmit first (step 1215).

In step 1220, the device immediately starts with sending the address, the command code and the command tag (if non-posted) until it samples the ready signal asserted (step 1225). It is then checked in step 1230 whether there are other pending requests. If there is no other pending request, the device must deassert the respective request line in step 1235, and it may keep it asserted otherwise.

It may then be determined in step 1240 whether the ready signal is still set. If so, the device sends a byte enable signal and the word count in step 1245 and proceeds to step 1250. In case of a read transaction, the transfer is now complete. If the transaction is a write transaction, the data is transferred over the address data line with every clock cycle where the ready line is asserted until the transmission is complete. With every data phase, the count value on the command signal line gets decremented until it reaches zero with the last double word transmission.

Figure 13:
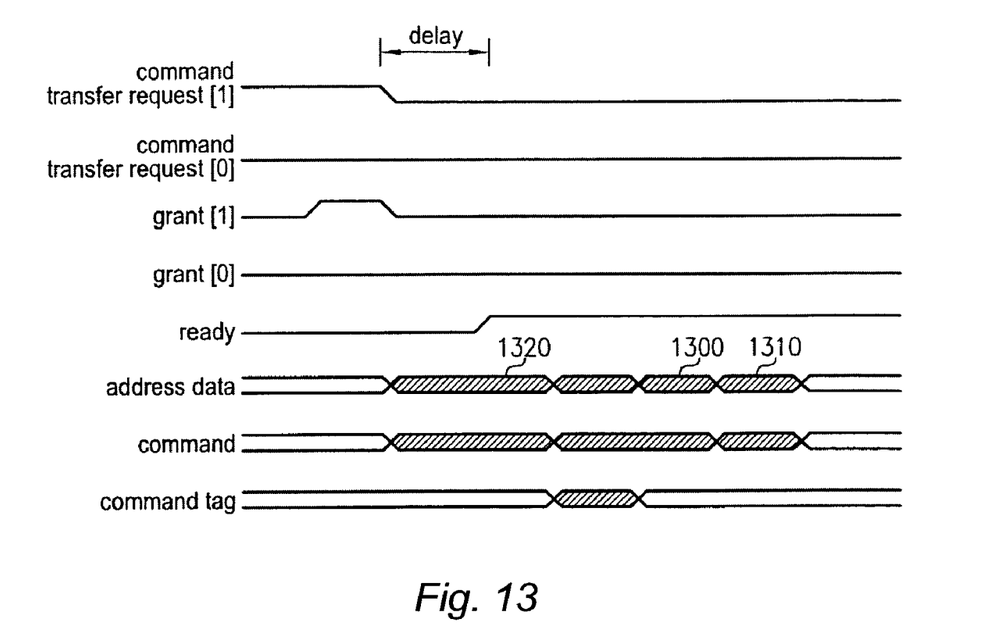
FIG. 13 is a waveform diagram illustrating waveforms that may occur in performing an upstream request transmission.
Figure 14:
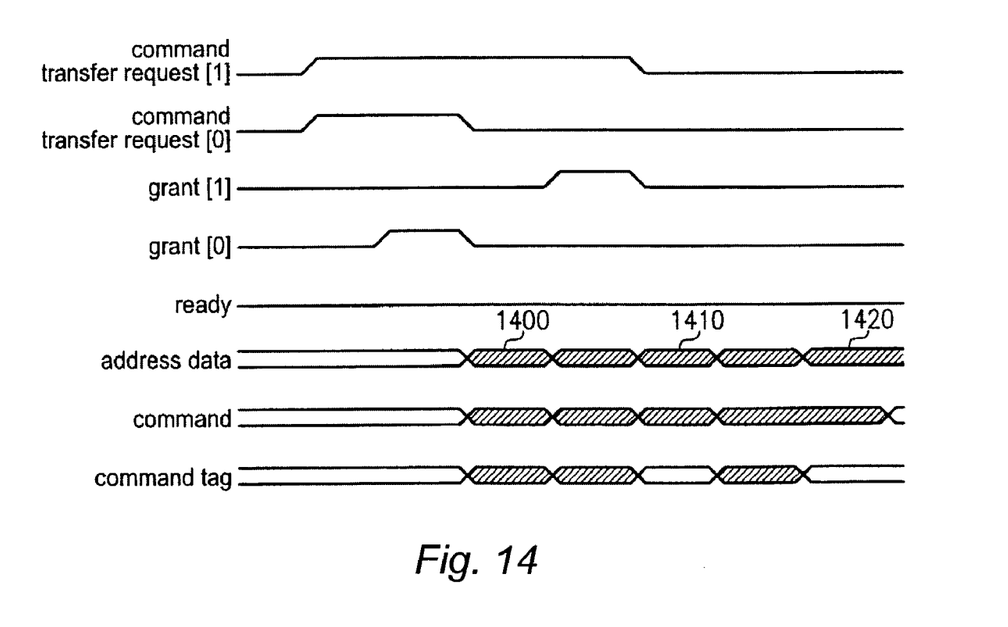
FIG. 14 is another waveform diagram pertaining to the upstream request transmission.
Figure 15:
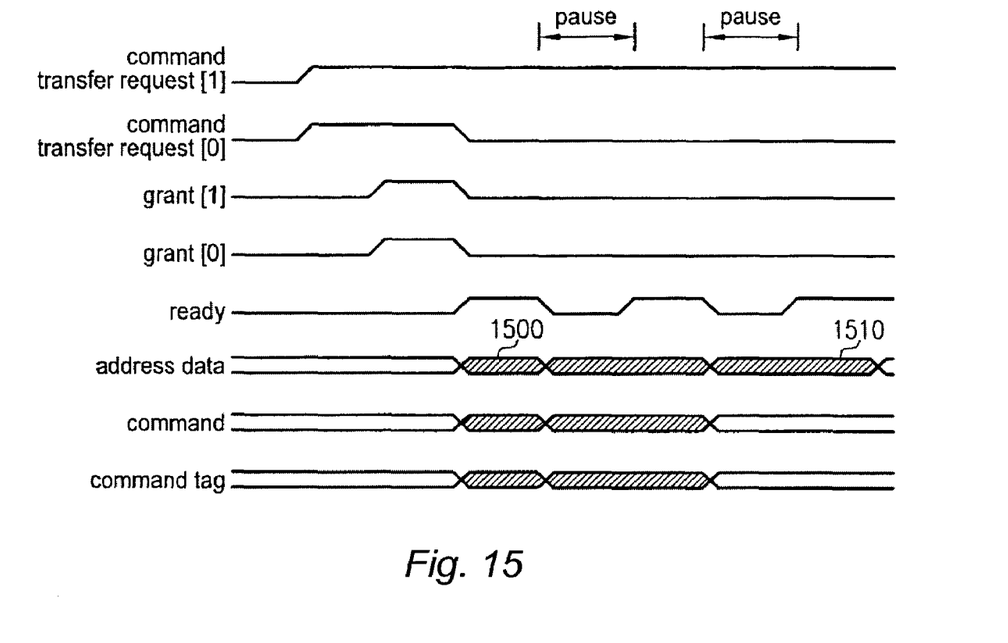
FIG. 15 is a further waveform diagram for illustrating waveforms in an upstream request transmission.

Turning now to the waveform diagrams illustrating examples of the upstream request transmission, FIG. 13 depicts the case of a single posted write transaction with two data phases 1300, 1310 where the host delays the address 1320 by one clock cycle. FIG. 14 illustrates a read and posted write back-to-back cycle where the address of the read transmission is signal 1400, the address of the write transmission is signal 1410 and the data of the write transmission is signal 1420. FIG. 15 illustrates the waveforms of a single non-posted write transmission with one address phase 1500 and one data phase 1510. By unsetting the ready signal, the host pauses the transmission.

Figure 16:
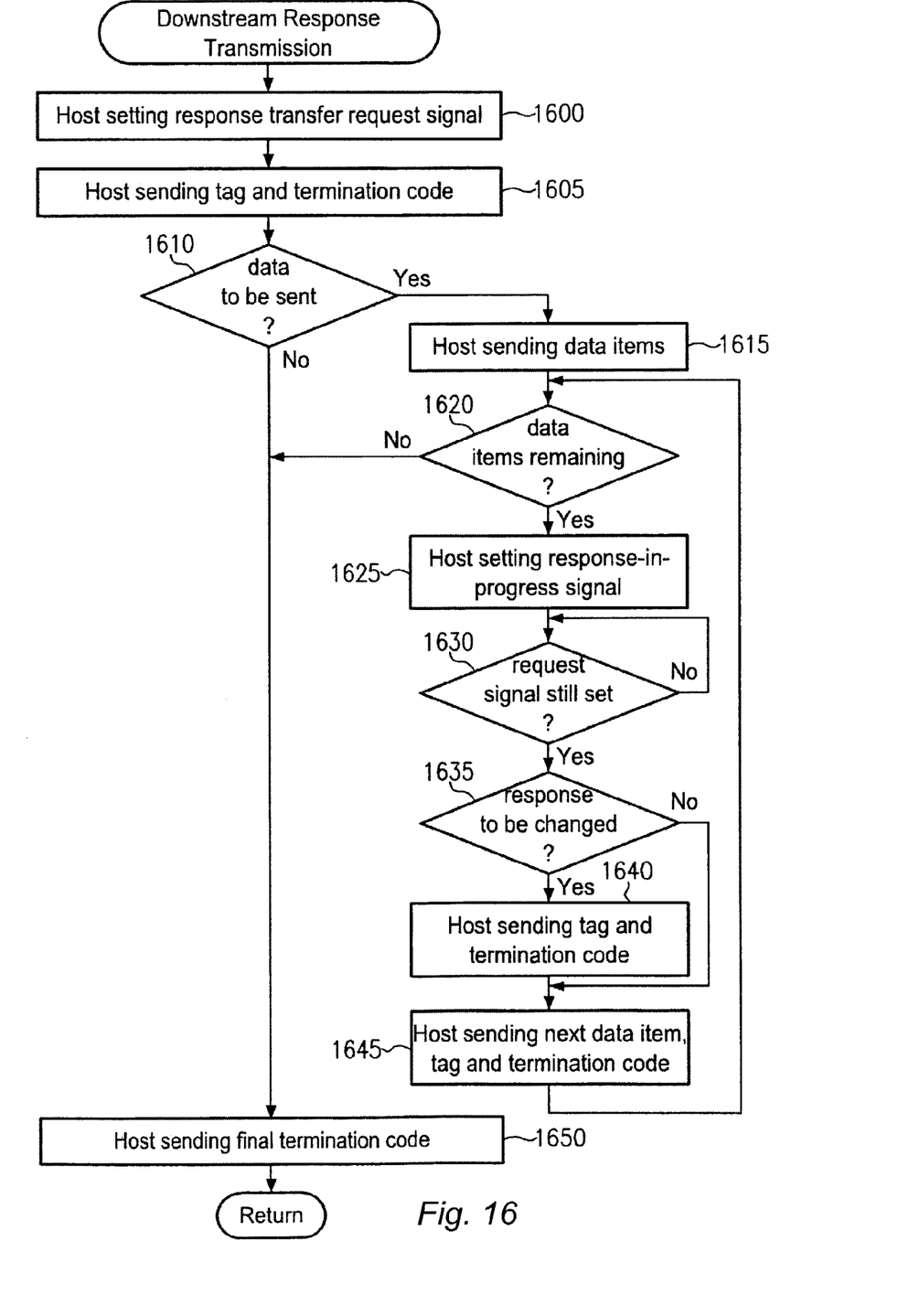
FIG. 16 is a flowchart illustrating the process of performing a downstream response transmission according to an embodiment.

The downstream response transmission process of the present embodiment is depicted in more detail in FIG. 16. As mentioned, when the device transmits a non-posted transmission it must be able to accept the respective response with full interface speed and without wait states. Responses may return out of order. The device may be responsible for reordering, if necessary.

The host starts a response transmission by setting the response transfer request signal in step 1600. At the same time, it places a response tag and termination code in step 1605. In case of a read response, the host further sends the first data item in step 1615. If the response has no data or only one data item then the host puts the final termination code in step 1650 onto the respective signal line, and otherwise it sets the termination code to a value that indicates that the response is still in progress (step 1625).

During this time, the host may be obliged to keep the request signal asserted and the response tag and termination code unchanged. The termination code may only change to the final termination code when the last data item gets transmitted. The host may insert wait states by deasserting the request signal but it may be obliged to keep the response tag and termination code unchanged. It may also mix up responses that have data with responses that have no data. The response tag and termination code get the respective values of the inserted response. The host may unset the request signal after the response transmission or it may keep the request signal asserted to start with a new response.

With the request assertion, the host places also the response valid information onto the response validation signal lines. If the response is not valid, the host must deassert the validation signal only if the response becomes valid, and this change may happen during any state of the request signal. The host may also keep the validation signal asserted when inserting the request signal. This means that the transmitted response is already valid. The host may also assert multiple validation lines at the same time. The device must not use any data of response (including the termination code) until a response becomes valid.

That is, the embodiment may apply ordering rules such as those defined in the HyperTransport specification, in particular to support connections to I/O bridges. The (separate) validation of responses would then be based on the ordering rules.

Figure 17:
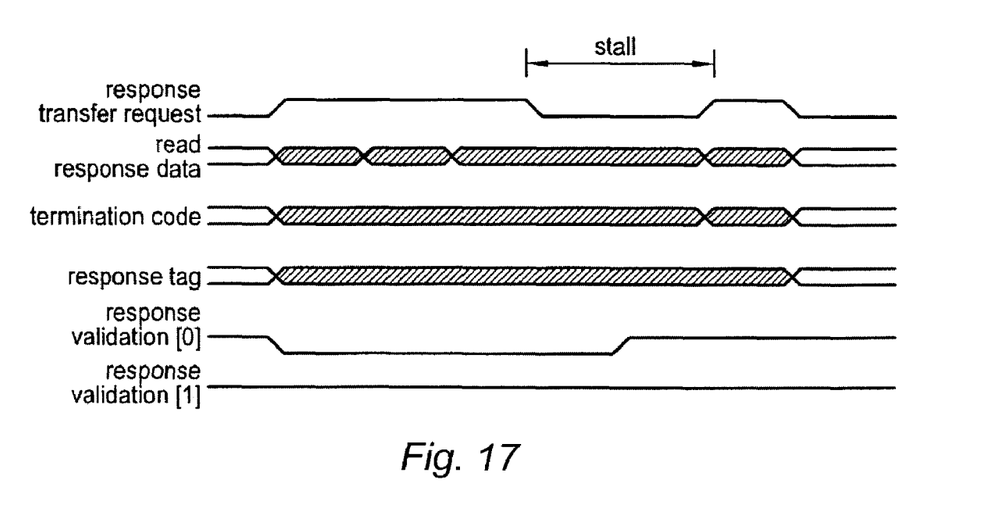
FIG. 17 is a waveform diagram showing waveforms that may occur when performing the downstream response transmission of FIG. 16.
Figure 18:
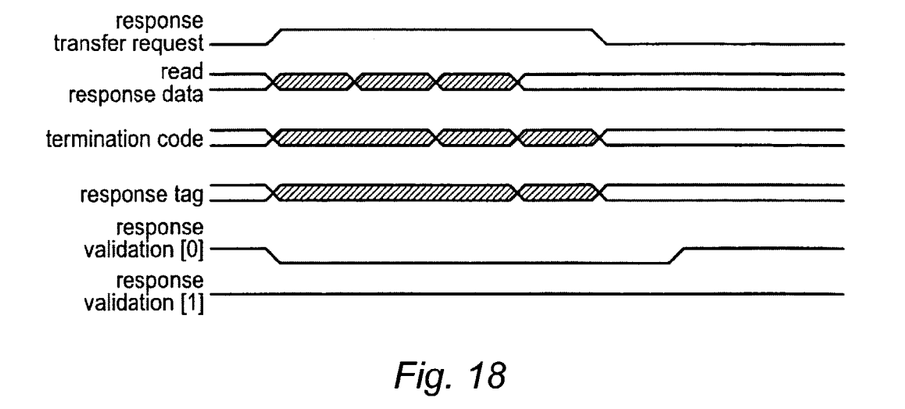
FIG. 18 is another waveform diagram pertaining to the downstream response transmission.
Figure 19:
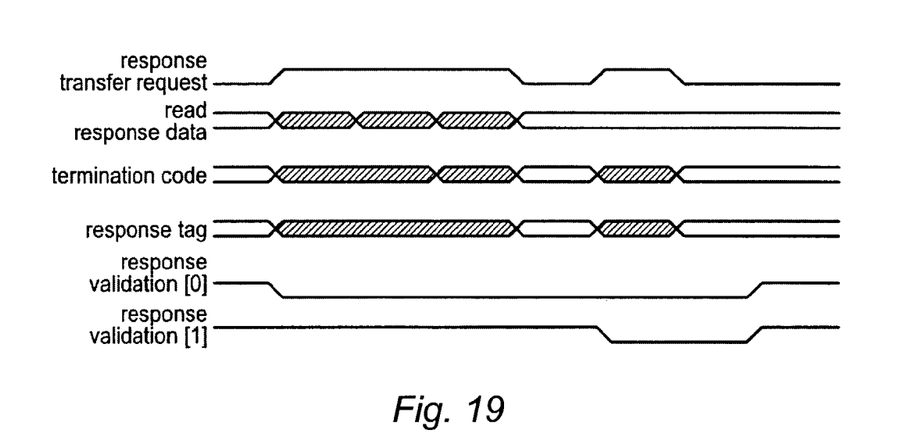
FIG. 19 is a waveform diagram showing another example of waveforms in the process of performing a downstream response transmission.
Figure 20:
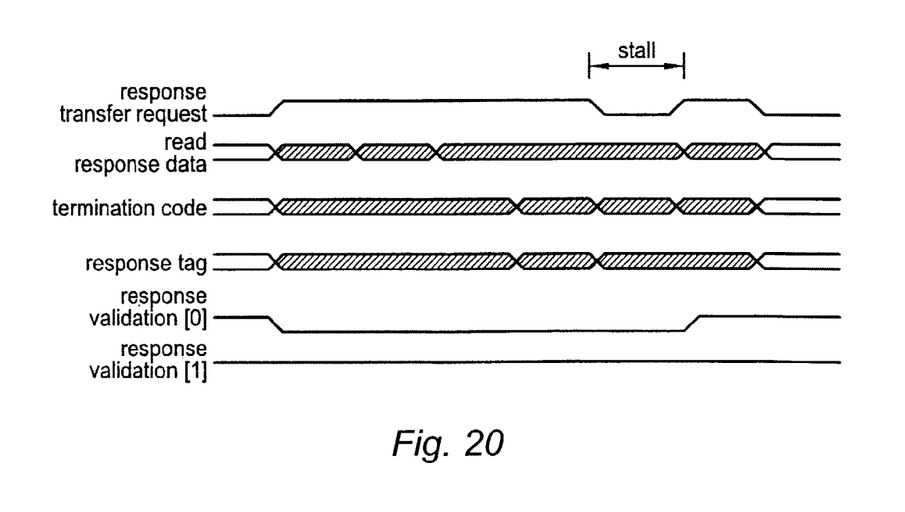
FIG. 20 is another waveform diagram of the downstream response transmission process.

Waveform examples of this process are depicted in FIGS. 17 to 20. In FIG. 17, a read response is depicted which is stalled by two clock cycles. During the stall, the response gets validated. FIG. 18 shows the case of a back-to-back read and write response where the first response gets validated later. In the example of FIG. 19, two responses are shown which get validated at the same time. In FIG. 20, a read response is depicted which has inserted a write response, and which is stalled by one cycle.

From the embodiments described above it is apparent that an on-chip interface is provided that improves over prior art techniques significantly. By providing a target interface that supports multiple outstanding non-posted requests, the interface performance is improved. Further, the source interface where the data is not stored in the host but only in the device may save area of the chip since it requires less memory, and may improve the performance because of reduced latency.

Thus, an improved interface is provided which gets the full performance of chip-to-chip interfaces down to the peripherals. Besides improving the system performance, the pin count may be reduced and the data protocols simplified.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. For instance, while the flowchats discussed above show the process steps performed in a specific sequence it is to be noted that some or all of the steps may be performed in other sequences, or even simultaneously. Moreover, while the target and source interfaces have been shown to include a number of signal lines, there may be further signal lines provided, and in addition, each of the signal lines discussed above may also be embodied as plurality of physical lines.

In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An integrated circuit chip comprising a first and a second circuit unit, wherein:
   each of said first and second circuit units are capable of sending requests to the other one of said first and second circuit units;
   each of said first and second circuit units are capable of sending back a response when receiving a request that requires a response;
   said first circuit unit is capable of storing data relating to a request to be sent; and
   said second circuit unit is not capable of storing data relating to a received request.

2. The integrated circuit chip of claim 1 wherein said data relating to a request includes request data forming the request.

3. The integrated circuit chip of claim 2 wherein said request data forming the request includes address data.

4. The integrated circuit chip of claim 2 wherein said second circuit unit is connected to said first circuit unit to provide a control signal to said first circuit unit, and said first circuit unit is arranged for delaying sending further request data if the control signal indicates that said second circuit unit is not ready for receiving further request data.

5. The integrated circuit chip of claim 4 wherein said request data forming the request includes at least two data items to be sent sequentially, and said first circuit unit is arranged for checking said control signal each time a data item is sent.

6. The integrated circuit chip of claim 4 wherein said second circuit unit is connected to said first circuit unit to provide a flush signal to said first circuit unit, and said first circuit unit is arranged for cancelling outstanding request data if the control signal indicates that said second circuit unit is not ready for receiving further request data, and the flush signal indicates that the outstanding request data is to be cancelled.

7. The integrated circuit chip of claim 2 wherein said first circuit unit is capable of storing request data of multiple requests.

8. The integrated circuit chip of claim 1 wherein said data relating to a request includes response data forming a response to the request.

9. The integrated circuit chip of claim 8 wherein said second circuit unit is connected to said first circuit unit to provide a control signal to said first circuit unit, and said first circuit unit is arranged for delaying sending response data if the control signal indicates that said second circuit unit is not ready for receiving response data.

10. The integrated circuit chip of claim 9 wherein said response data forming the response includes at least two data items to be sent sequentially, and said first circuit unit is arranged for checking said control signal each time a data item is sent.

11. The integrated circuit chip of claim 8 wherein said first circuit unit is capable of storing response data relating to multiple requests.

12. The integrated circuit chip of claim 1 wherein:
   said second circuit unit is capable of storing data relating to a request to be sent; and
   said first circuit unit is not capable of storing data relating to a received request.

13. The integrated circuit chip of claim 12 wherein said data relating to a request includes request data forming the request.

14. The integrated circuit chip of claim 13 wherein said first circuit unit is connected to said second circuit unit to provide a control signal to said second circuit unit, and said second circuit unit is arranged for delaying sending further request data if the control signal indicates that said first circuit unit is not ready for receiving further request data.

15. The integrated circuit chip of claim 14 wherein said request data forming the request includes at least two data items to be sent sequentially, and said second circuit unit is arranged for checking said control signal each time a data item is sent.

16. The integrated circuit chip of claim 13 wherein said second circuit unit is capable of storing request data of multiple requests.

17. The integrated circuit chip of claim 12 wherein said data relating to a request includes response data forming a response to the request.

18. The integrated circuit chip of claim 17 wherein said first circuit unit is connected to said second circuit unit to provide a control signal to said second circuit unit, and said second circuit unit is arranged for delaying sending response data if the control signal indicates that said first circuit unit is not ready for receiving response data.

19. The integrated circuit chip of claim 18 wherein said response data forming the response includes at least two data items to be sent sequentially, and said second circuit unit is arranged for checking said control signal each time a data item is sent.

20. The integrated circuit chip of claim 17 wherein said second circuit unit is capable of storing response data relating to multiple requests.

21. The integrated circuit chip of claim 1 wherein the second circuit unit is a host unit for providing a service to the first circuit unit.

22. The integrated circuit chip of claim 1 wherein said data relating to a request includes bus master data.

23. The integrated circuit chip of claim 1 being a southbridge chip for use in a computer system.

24. The integrated circuit chip of claim 1 being part of a chipset for use in a computer system.

25. The integrated circuit chip of claim 1 wherein:
said first and second circuit units are interconnected by means of at least four signal lines;
a first one of said at least four signal lines is for transferring requests from said first circuit unit to said second circuit unit;
a second one of said at least four signal lines is for transferring responses from said second circuit unit to said first circuit unit;
a third one of said at least four signal lines is for transferring requests from said second circuit unit to said first circuit unit;
a fourth one of said at least four signal lines is for transferring responses from said first circuit unit to said second circuit unit; and
said first to fourth ones of said signal lines are decoupled from each other.

26. A southbridge device comprising an integrated circuit chip having a first and a second circuit unit, wherein:
each of said first and second circuit units are capable of sending requests to the other one of said first and second circuit units;
each of said first and second circuit units are capable of sending back a response when receiving a request that requires a response;
said first circuit unit is capable of storing data relating to a request to be sent; and
said second circuit unit is not capable of storing data relating to a received request.

27. The southbridge device of claim 26 wherein said data relating to a request includes request data forming the request.

28. The southbridge device of claim 27 wherein said second circuit unit is connected to said first circuit unit to provide a control signal to said first circuit unit, and said first circuit unit is arranged for delaying sending further request data if the control signal indicates that said second circuit unit is not ready for receiving further request data.

29. The southbridge device of claim 28 wherein said request data forming the request includes at least two data items to be sent sequentially, and said first circuit unit is arranged for checking said control signal each time a data item is sent.

30. The southbridge device of claim 28 wherein said second circuit unit is connected to said first circuit unit to provide a flush signal to said first circuit unit, and said first circuit unit is arranged for cancelling outstanding request data if the control signal indicates that said second circuit unit is not ready for receiving further request data, and the flush signal indicates that the outstanding request data is to be cancelled.

31. The southbridge device of claim 27 wherein said first circuit unit is capable of storing request data of multiple requests.

32. The southbridge device of claim 26 wherein said data relating to a request includes response data forming a response to the request.

33. The southbridge device of claim 32 wherein said second circuit unit is connected to said first circuit unit to provide a control signal to said first circuit unit, and said first circuit unit is arranged for delaying sending response data if the control signal indicates that said second circuit unit is not ready for receiving response data.

34. The southbridge device of claim 33 wherein response data forming the response includes at least two data items to be sent sequentially, and said first circuit unit is arranged for checking said control signal each time a data item is sent.

35. The southbridge device of claim 32 wherein said first circuit unit is capable of storing response data relating to multiple requests.

36. The southbridge device of claim 26 wherein:
said second circuit unit is capable of storing data relating to a request to be sent; and
said first circuit unit is not capable of storing data relating to a received request.

37. The southbridge device of claim 26 wherein said data relating to a request includes bus master data.

38. The southbridge device of claim 26 wherein:
said first and second circuit units are interconnected by means of at least four signal lines;
a first one of said at least four signal lines is for transferring requests from said first circuit unit to said second circuit unit;
a second one of said at least four signal lines is for transferring responses from said second circuit unit to said first circuit unit;
a third one of said at least four signal lines is for transferring requests from said second circuit unit to said first circuit unit;
a fourth one of said at least four signal lines is for transferring responses from said first circuit unit to said second circuit unit; and
said first to fourth ones of said signal lines are decoupled from each other.

39. A method of operating an integrated circuit chip comprising a first and a second circuit unit, comprising:
sending requests from one of said first and second circuit units to the other one of said first and second circuit units; and
sending back a response from said other one of said first and second circuit units to said one of said first and second circuit units if said request requires a response;
wherein the method further comprises:
operating said first circuit unit to store data relating to a request to be sent by said first circuit unit; and
operating said second circuit unit not to store data relating to a request received by said second circuit unit.

40. The method of claim 39 wherein said data relating to a request includes request data forming the request.

41. The method of claim 40 further comprising:
provide a control signal from said second circuit unit to said first circuit unit; and
operating said first circuit unit to delay sending further request data if the control signal indicates that said second circuit unit is not ready for receiving further request data.

42. The method of claim 41 wherein said request data forming the request includes at least two data items to be sent sequentially, and the method further comprises:
operating said first circuit unit to check said control signal each time a data item is sent.

43. The method of claim 41 further comprising:
providing a flush signal from said second circuit unit to said first circuit unit; and
operating said first circuit unit to cancel outstanding request data if the control signal indicates that said second circuit unit is not ready for receiving further request data, and the flush signal indicates that the outstanding request data is to be cancelled.

44. The method of claim 40 further comprising:
operating said first circuit unit to store request data of multiple requests.

45. The method of claim 39 wherein said data relating to a request includes response data forming a response to the request.

46. The method of claim 45 further comprising:
providing a control signal from said second circuit unit to said first circuit unit; and
operating said first circuit unit to delay sending response data if the control signal indicates that said second circuit unit is not ready for receiving response data.

47. The method of claim 46 wherein said response data forming the response includes at least two data items to be sent sequentially, and the method further comprises:
operating said first circuit unit to check said control signal each time a data item is sent.

48. The method of claim 45 further comprising:
operating said first circuit unit to store response data relating to multiple requests.

49. The method of claim 39 further comprising:
operating said second circuit unit to store data relating to a request to be sent by said second circuit unit; and
operating said first circuit unit not to store data relating to a request received by said first circuit unit.

50. The method of claim 49 wherein said data relating to a request includes request data forming the request.

51. The method of claim 50 further comprising:
providing a control signal from said first circuit unit to said second circuit unit; and
operating said second circuit unit to delay sending further request data if the control signal indicates that said first circuit unit is not ready for receiving further request data.

52. The method of claim 51 wherein said request data forming the request includes at least two data items to be sent sequentially, and the method further comprises:
operating said second circuit unit to check said control signal each time a data item is sent.

53. The method of claim 50 further comprising:
operating said second circuit unit to store request data of multiple requests.

54. The method of claim 49 wherein said data relating to a request includes response data forming a response to the request.

55. The method of claim 54 further comprising:
providing a control signal from said first circuit unit to said second circuit unit; and
operating said second circuit unit to delay sending response data if the control signal indicates that said first circuit unit is not ready for receiving response data.

56. The method of claim 55 wherein said response data forming the response includes at least two data items to be sent sequentially, and the method further comprises:
operating said second circuit unit to check said control signal each time a data item is sent.

57. The method of claim 54 further comprising:
operating said second circuit unit to store response data relating to multiple requests.

58. The method of claim 39 wherein the second circuit unit is a host unit for providing a service to the first circuit unit.

59. The method of claim 39 wherein said data relating to a request includes bus master data.

60. The method of claim 39 being a method of operating a southbridge chip for use in a computer system.

61. The method of claim 39 being a method of operating a chipset for use in a computer system.

* * * * *